United States Patent [19]  [11] 4,266,926
Gordon  [45] May 12, 1981

[54] PIPE BELLING WITH EXTERNAL FLUID PRESSURE

[76] Inventor: John H. Gordon, 855 Brandywine Rd., Downingtown, Pa. 19335

[21] Appl. No.: 77,658

[22] Filed: Sep. 21, 1979

[51] Int. Cl.³ .............................................. B29D 23/00
[52] U.S. Cl. ................................. 425/387.1; 425/393; 425/DIG. 218
[58] Field of Search ..................... 425/387.1, 392, 393, 425/DIG. 218; 264/296, 322

[56] References Cited

U.S. PATENT DOCUMENTS

| | | |
|---|---|---|
| 1,698,999 | 1/1929 | Hothersall . |
| 3,205,535 | 9/1965 | Niessner et al. |
| 3,484,900 | 12/1969 | Sands et al. |
| 3,728,059 | 4/1973 | de Putter ............................ 425/155 |
| 3,732,054 | 5/1973 | Lyng .................................... 425/393 |
| 3,849,052 | 11/1974 | Gordon ............................ 425/387.1 |
| 3,852,016 | 12/1974 | Delauzun ............................ 425/393 |
| 3,960,472 | 6/1976 | O'Conner et al. .................. 425/393 |
| 3,989,439 | 11/1976 | Schmitzberger .................... 425/392 |
| 4,032,282 | 6/1977 | Wilson et al. ........................ 425/393 |
| 4,063,862 | 12/1977 | Johansson ............................ 425/392 |
| 4,080,140 | 3/1978 | Wilson et al. ........................ 425/393 |
| 4,161,384 | 7/1979 | McGregor ........................ 425/393 X |

Primary Examiner—Thomas P. Pavelko
Attorney, Agent, or Firm—Weiser, Stapler & Spivak

[57] ABSTRACT

A pipe belling system utilizing external air pressure is disclosed which includes a horizontally reciprocating, shaped mandrel which may or may not have expanding segments for forming an internal groove in the pipe bell. A pair of cooperating upper and lower pressure clamps are oppositely vertically reciprocal relative to the bell end of the pipe and incorporate suitable seals, air inlet and outlet connections and water inlet and outlet connections to form a fluid pressure chamber to automatically produce a formed bell without external clamps.

18 Claims, 9 Drawing Figures

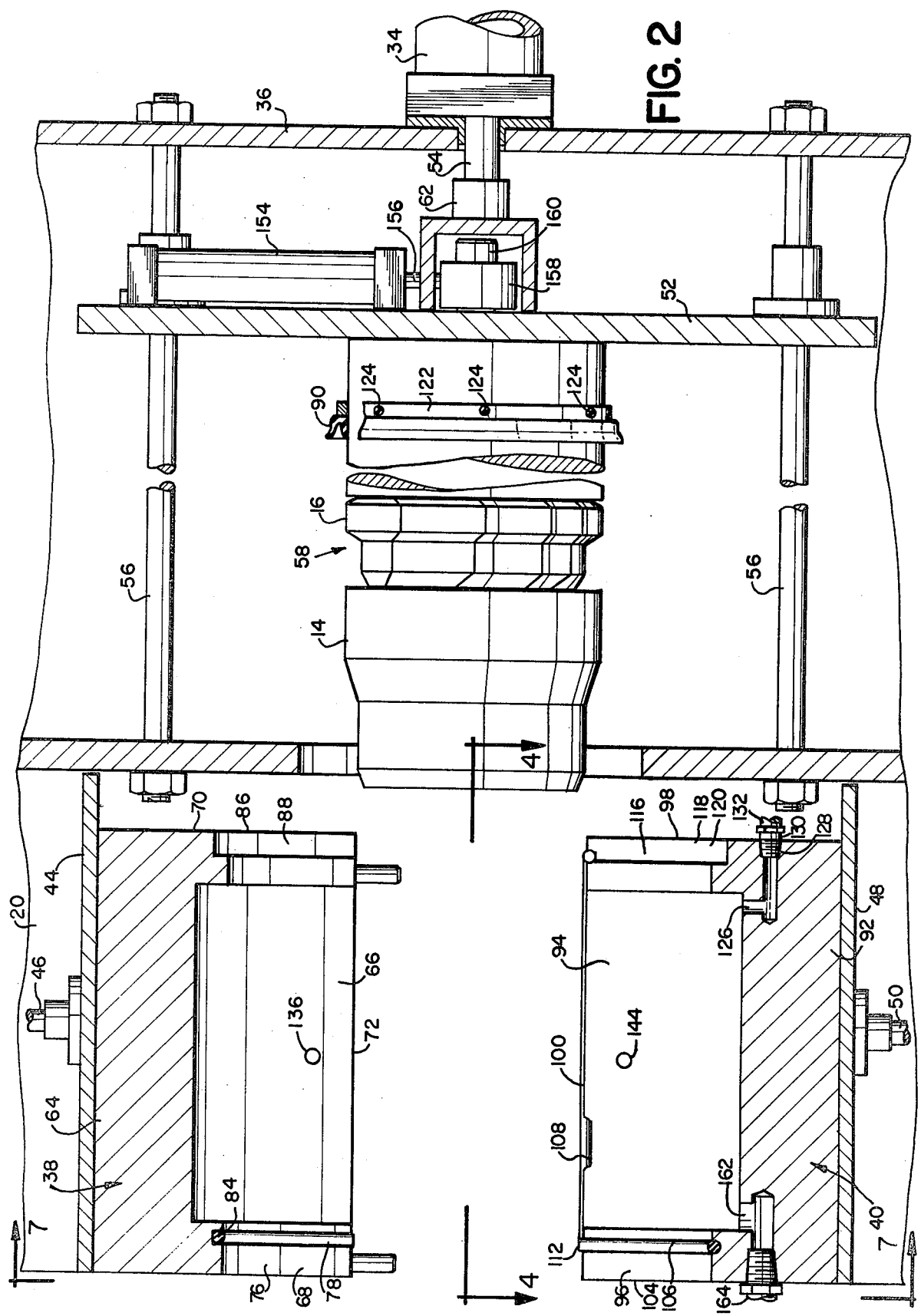

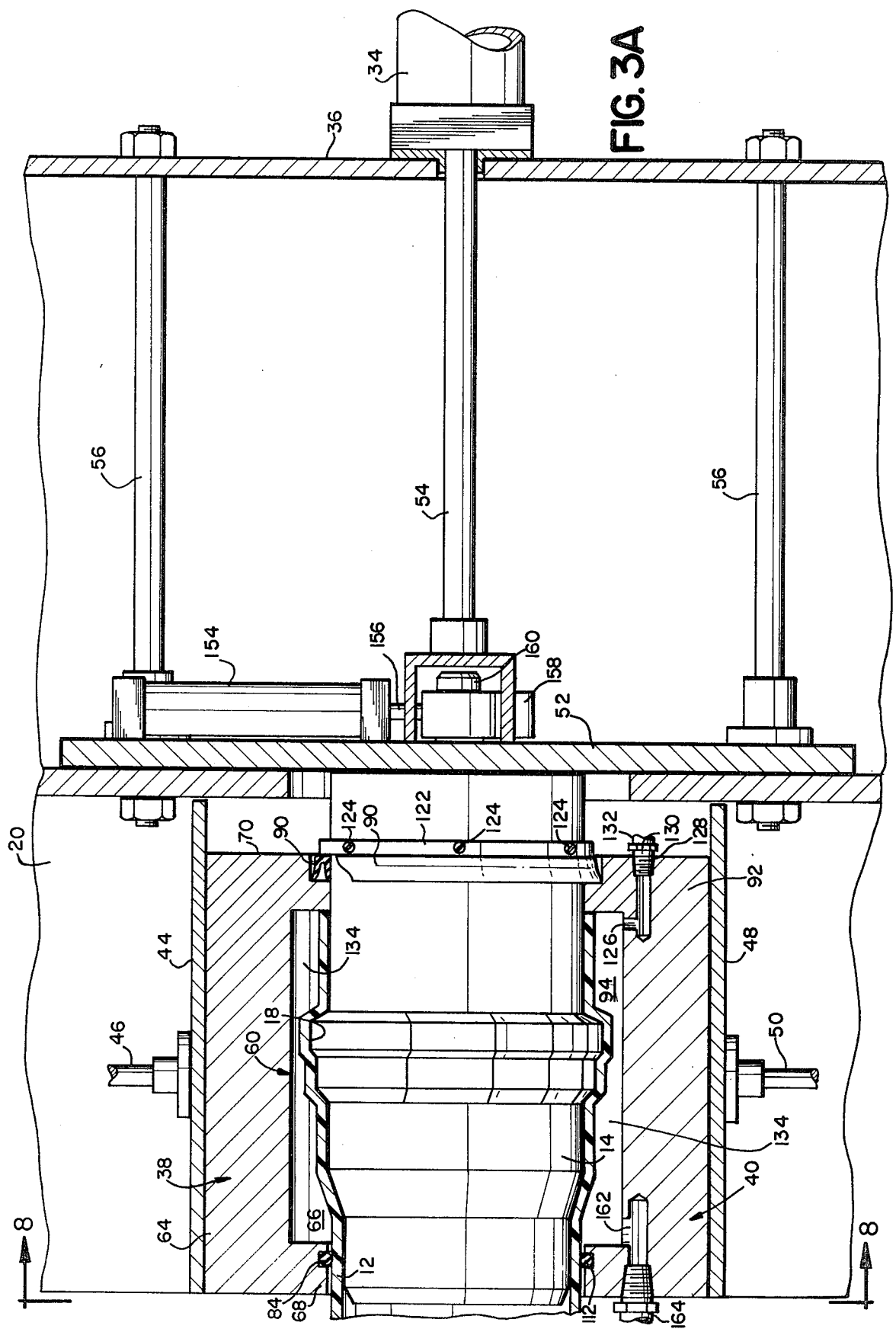

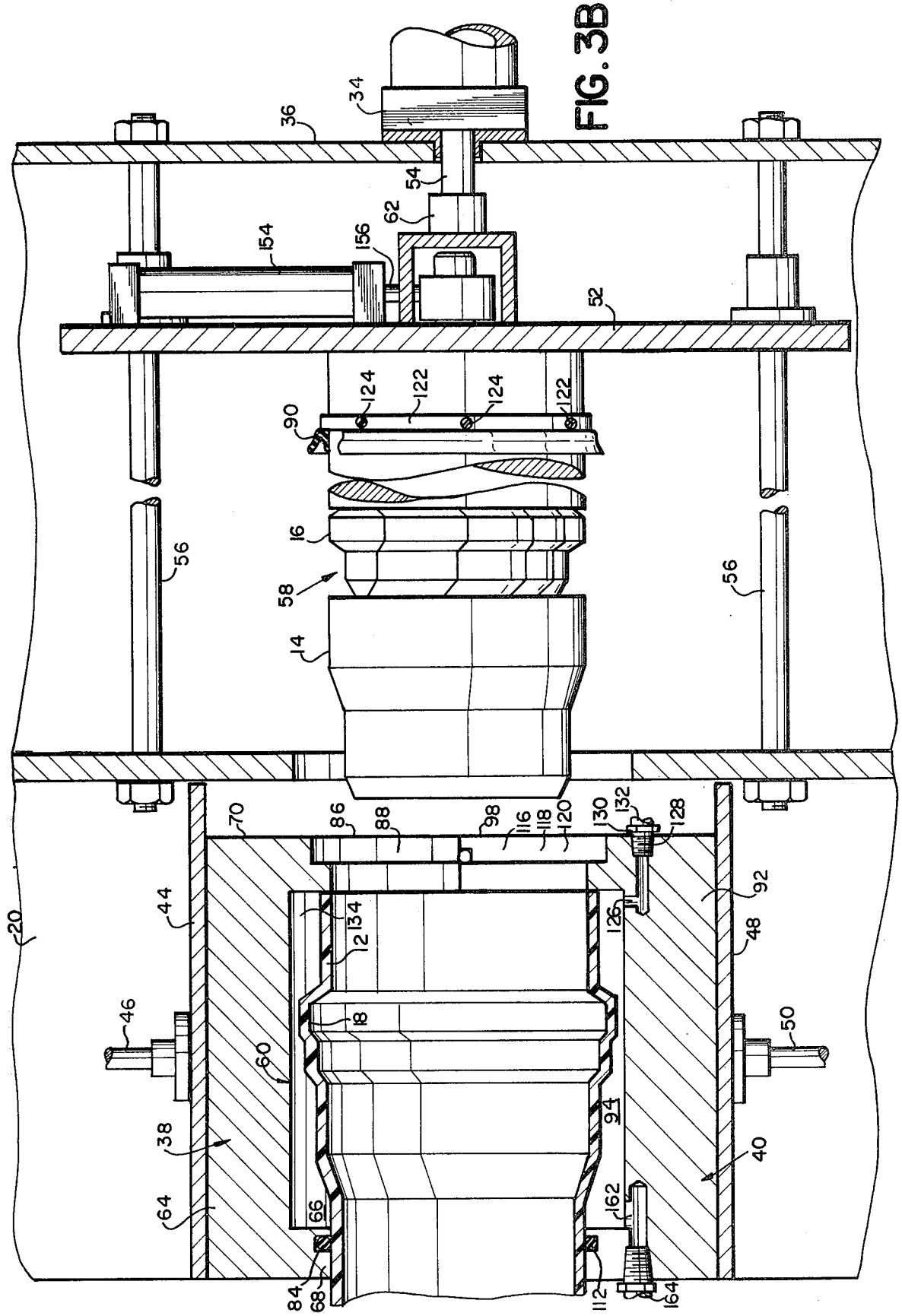

PIPE BELLING WITH EXTERNAL FLUID PRESSURE

BACKGROUND OF THE DISCLOSURE

The present invention relates generally to the field of forming a bell or sockets in the end of a length of plastic pipe, and more particularly, is directed to an automatic, pressurized, sealed forming apparatus capable of producing sharply defined bells on plastic pipe regardless of wall thickness.

It is the present practice to utilize known types of plastic pipe forming apparatus to provide a bell shape in one end of each length of pipe to allow joints in adjacent lengths of plastic pipe to be readily made in the field by utilizing known techniques and existing tools. The presently available pipe belling machines usually incorporate a means to heat one end of the plastic pipe prior to belling to soften the plastic, a mandrel means to shape the interior of the bell at the heated pipe end and external clamps to shape the exterior periphery of the belled end during the belling process. The prior art devices usually also incorporate suitable cooling means to set the shaped end after belling in a relatively rapid manner to provide efficient utilization of the machine and to reduce time requirements and production costs.

It is now increasingly popular and necessary to provide an interior groove in the bell as the pipe bell is formed to accommodate a sealing gasket which can be applied within the groove to quickly and automatically seal the pipe joint when adjacent lengths of pipe are joined together. To form such an internal groove, it is the common practice to provide a plurality of expanding and contracting cooperating segments within the mandrel construction to thereby permit the mandrel to automatically and simultaneously form both the interior configuration of the pipe bell and also the interior peripheral groove.

It will be appreciated that wall thicknesses of plastic pipes vary widely from pipe to pipe due to the design requirements of such parameters as pipe diameter, type of service of the pipe, the type of plastic employed in fabricating the pipe, pressure requirements and other such design considerations. Due to the variances in wall thickness of the different plastic pipes which are presented to a belling fabricator for pipe belling purposes, each mandrel for each diameter of pipe previously had to be equipped with various sized external clamps, which clamps were specifically designed and configured for a particular pipe wall thickness. Accordingly, it was possible for one mandrel to require several sets of clamps in order to make a machine relatively universally adaptable for the pipes normally treated by a single plant. In other instances, additional tooling costs were involved in carefully machining the clamps to assure forming bells with minimum acceptable wall thickness throughout the entire bell, including the critical area in and about the internal groove. Because of this, tooling and equipment costs have become quite expensive when utilizing existing machines to form pipe bells by employing the combination of a mandrel with external clamps.

Additionally, the external clamps have proved to be deficient to a degree in that the use of such external clamps has usually resulted in marring the external periphery of the belled end of the pipe due to imperfections in the surfaces of the clamps, and imperfections in the mating surfaces of the cooperating upper and lower clamp halves due to misalignment of the parts during the bell forming operations.

SUMMARY OF THE INVENTION

The present invention relates generally to pipe belling apparatus, and more particularly, is directed to a novel pipe belling machine which employs an internal mandrel with an external pressure chamber to form a uniform, sharp bell on plastic pipes of all wall thicknesses.

The present invention includes a horizontally reciprocating mandrel which may be equipped with a plurality of cooperating segments designed in known manner to expand and contract to form an internal, peripheral groove as the bell is formed in one end of a length of plastic pipe.

A pair of separable, upper and lower pressure clamps are vertically separable in front of the mandrel to receive a heated end of a length of plastic pipe therewithin and to form a pressure chamber thereabout. Suitable sealing means are provided to seal the junction between the pressure chamber halves and also to seal the pressure chamber halves about the plastic pipe.

The pressure chamber halves are each provided with fluid inlet and outlet fittings whereby an external fluid pressure of between 80 psi to 100 psi can be applied exteriorly about the pipe to uniformly press the heated end of the pipe against the mandrel for bell forming. The application of the exterior fluid pressure forces uniformly presses the soft, heated plastic pipe material against the mandrel to accentuate the forming of the bell and to provide sharp definition at all curved or straight finished pipe bell interior configurations.

It is noteworthy that the pressure chamber halves are larger in dimension than the exterior periphery of the finished pipe bell and that the walls defining the upper and lower pressure clamps do not contact or engage the pipe bell in any manner. It is the fluid pressure itself that presses the heated, soft pipe wall material against the mandrel for bell forming without the need for exterior clamps or similar tooling. Accordingly, a single pair of cooperating pressure chamber clamps can be employed with a mandrel for bell forming whereby the same apparatus can be employed for use with pipes of various wall thicknesses without special tooling.

It is therefore an object of the present invention to provide an improved pipe belling apparatus of the type set forth.

It is another object of the present invention to provide a novel pipe belling apparatus to form a sharply defined bell in a heated end of a length of plastic pipe without employing exterior clamps.

It is another object of the present invention to provide a novel pipe belling apparatus that comprises a reciprocal mandrel to form the interior configuration of a pipe bell and a pair of cooperating, oppositely reciprocal, pressure clamps to form a pressure chamber about the bell end of the pipe to uniformly press the pipe sidewalls against the mandrel.

It is another object of the present invention to provide a novel pipe belling apparatus comprising mandrel means to form the configuration of the pipe bell and pressure chamber means to apply exterior fluid pressure forces uniformly about the exterior periphery of the pipe bell.

It is another object of the present invention to provide a novel pipe belling apparatus for forming a bell shape in the end of a length of plastic pipe that includes a pair of cooperating, separable pressure clamps to form a pressure chamber about the pipe end and air inlet and outlet connections and water inlet and outlet connections in the pressure clamps to apply pressure forces and cooling means to the belled end of the pipe.

It is another object of the present invention to provide a novel pipe belling apparatus that is simple in design, rugged in construction and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 2 is an enlarged, partial, cross sectional view taken along line 2—2 of FIG. 1, looking in the direction of the arrows, showing pressure clamps and mandrel in initial position.

FIG. 3A is an enlarged, partial, cross sectional view similar to FIG. 2 showing the pressure clamps and mandrel in belling position.

FIG. 3B is an enlarged, partial, cross sectional view similar to FIG. 2 showing the mandrel withdrawn from the belled end of the pipe.

DESCRIPTION OF THE PREFERRED EMBODIMENT OF THE INVENTION

Figure 1:
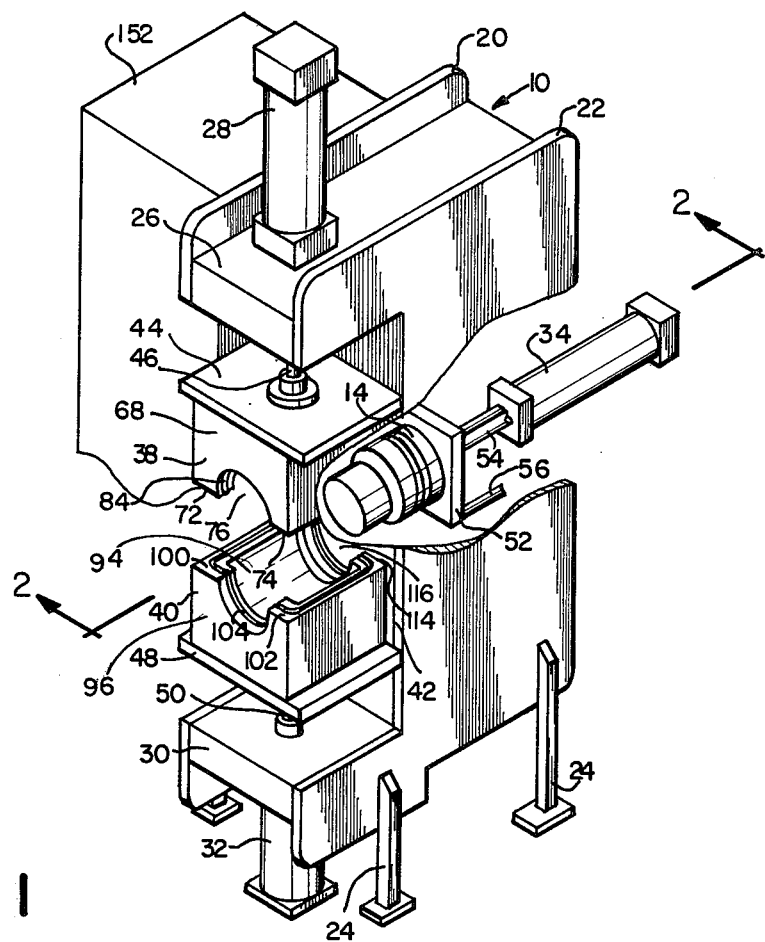
FIG. 1 is a perspective view showing the pipe belling machine in initial position with portions thereof broken away to expose interior construction details.
Figure 5:
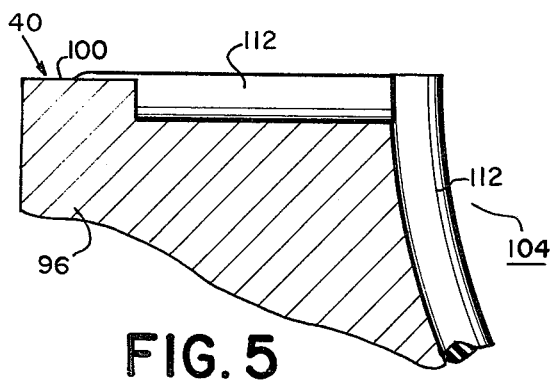
FIG. 5 is an enlarged, partial, cross sectional view taken along 5—5 on FIG. 4, looking in the direction of the arrows.
Figure 6:
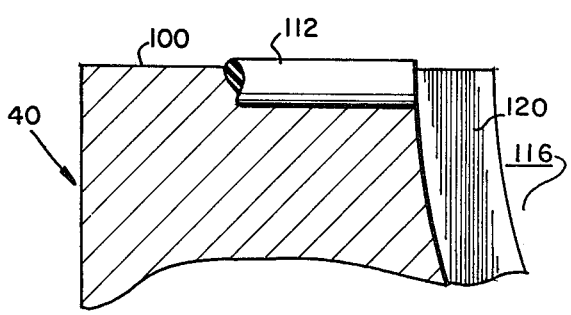
FIG. 6 is an enlarged, partial, cross sectional view taken along line 6—6 on FIG. 4, looking in the direction of the arrows.
Figure 4:
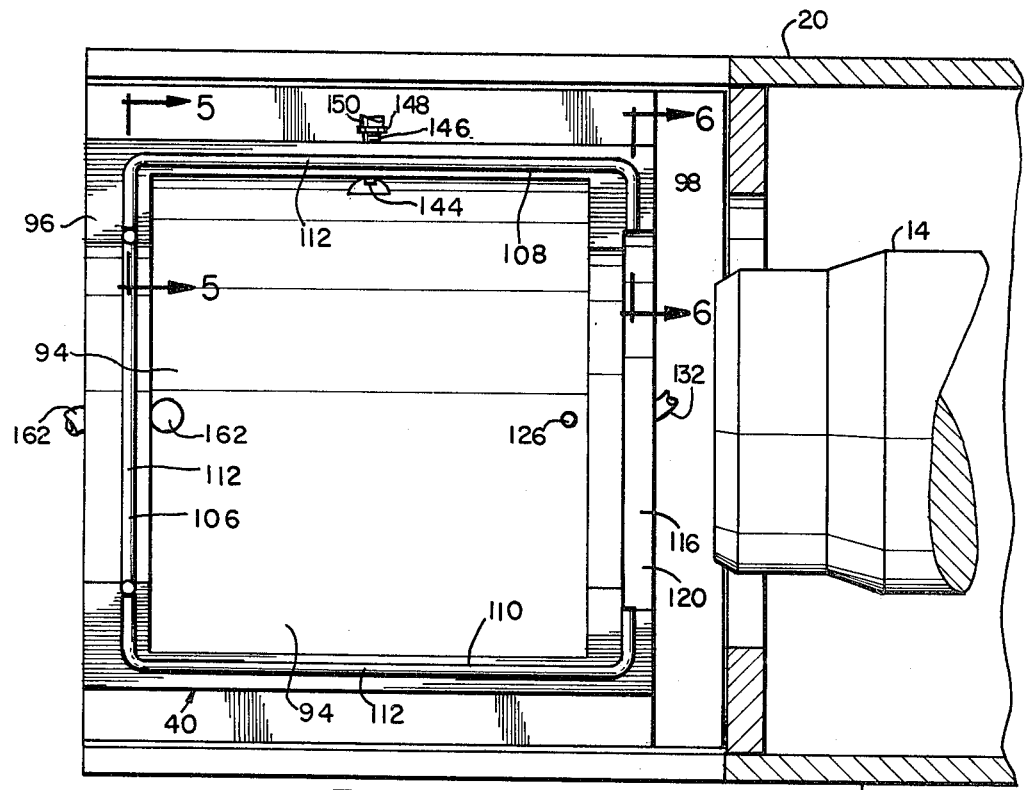
FIG. 4 is a cross sectional view taken along line 4—4 on FIG. 2, looking in the direction of the arrows.
Figure 8:
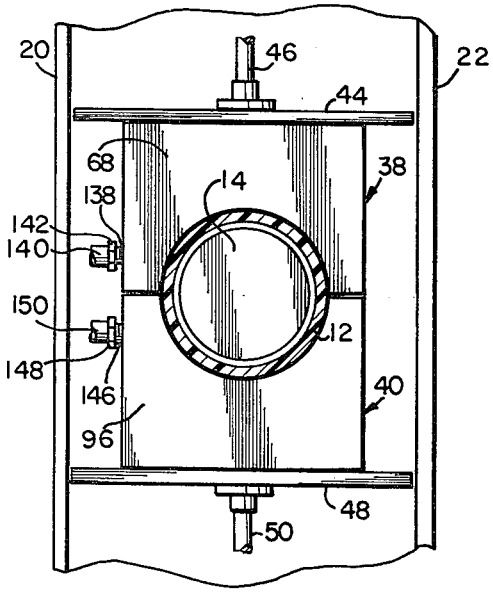
FIG. 8 is a partial, front elevational view, on reduced scale, looking from line 8—8 on FIG. 3A in the direction of the arrows.
Figure 7:
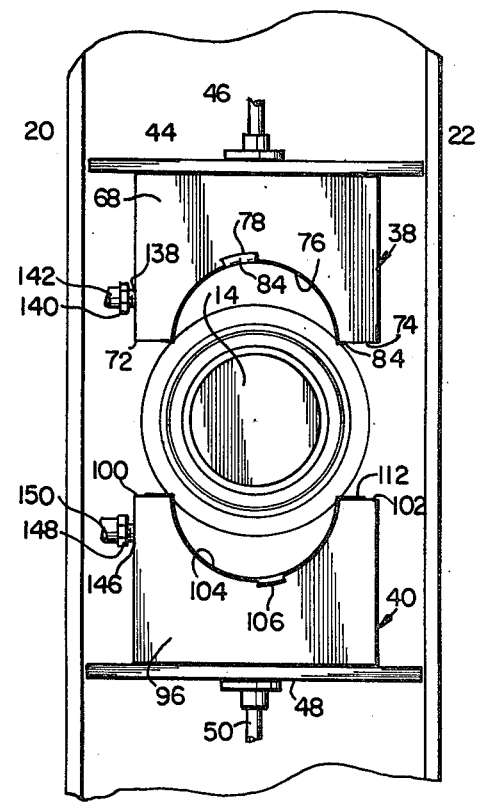
FIG. 7 is a front elevational view, on reduced scale, looking from line 7—7 on FIG. 2 in the direction of the arrows.

Although specific terms are used in the following description for the sake of clarity, these terms are intended to refer only to the particular structure of the invention selected for illustration in the drawings and are not intended to define or limit the scope of the invention.

Referring now to the drawings, there is shown in FIG. 1 a pipe belling machine 10 suitable to receive lengths of plastic pipe 12 (FIG. 3A) to form a shaped bell at one end of the pipe. In practicing the present invention, the plastic pipe 12 is presented to the belling machine 10 in formed lengths with one end thereof heated as necessary to permit the mandrel 14 to suitably form the desired bell shape. Numerous types of apparatus are well known to transport plastic pipes 12 individually to the pipe belling machine 10 while heating one end of the pipe during the transporting. Inasmuch as such apparatus is so well known and is in common use throughout the industry, such apparatus need not be herein set forth in detail nor otherwise described and such prior art devices form no part of the present invention. Similarly, numerous types of mandrels for forming bells or sockets in plastic pipes are known. The mandrel 14 of the present invention includes a plurality of expanding segments 16 to form an internal groove 18. One mandrel suitable for this purpose has been developed and is fully described in U.S. Patent Application Ser. No. 001,956 filed Jan. 8, 1979 and entitled "Mandrel With Identical Expanding Segments".

The pipe belling machine 10 includes a sturdy support system including left and right steel side plates 20, 22 which are carried above the floor by the support legs 24. An upper plate 26 is welded or otherwise secured between the left and right side plates 20, 22 and upwardly carries an upper cylinder 28 which is arranged for upper pressure clamp reciprocation as hereinafter more fully set forth. A lower plate 30 is similarly secured between the left and right side plates 20, 22 in registry below the upper plate 26 and securely carries a lower cylinder 32 for vertical reciprocation of the lower pressure clamp as hereinafter more fully set forth. A sturdy steel back plate 36 is suitable supported to carry the horizontally oriented mandrel operating cylinder 34 to permit horizontal reciprocation of the mandrel 14 during the pipe belling operation.

Still referring to FIG. 1, a pair of cooperating upper and lower pressure clamps 38, 40 are oppositely vertically reciprocal between the upper and lower plates 26, 30 and are guided for vertical reciprocation by suitable gibs 42 or other vertical guides of known configuration. The upper pressure clamp 38 is secured to an upper platen 44, which platen is upwardly moved by the upper piston rod 46 during the pipe belling operation. Similarly, the lower pressure clamp 40 is secured to the lower platen 48, which lower platen is affixed to the lower piston rod 50 for vertical reciprocation by the lower hydraulic cylinder 32.

Referring now to FIGS. 2 and 3A, it will be seen that the mandrel 14 and its affixed platen 52 are horizontally reciprocal between the rearward position 58 as illustrated in FIG. 2 to the belling position 60 as illustrated in FIG. 3A. The mandrel platen 52 is reciprocated by the mandrel piston arm 54 along a traverse system 56, which, in the illustrated embodiment, comprises a plurality of horizontal, reciprocal moveable slide mechanism to facilitate horizontal, reciprocal movement of the mandrel platen 52 and the mandrel 14. It is also contemplated that in lieu of the support system 56 illustrated, a trolley support suspended from the upper plate 26 could also be advantageously employed. However, inasmuch as it is the horizontal reciprocal movement of the mandrel 14 which accomplishes the desired purpose and not the actual mechanism necessary to horizontally carry the mandrel, the trolley embodiment need not here be illustrated in detail. The mandrel piston arm 54 terminates forwardly in a coupling 62 to assure positive reciprocation of the platen 52 and the mandrel 14 upon activation of the mandrel cylinder 34.

The belling portion of the machine comprises the upper and lower pressure clamps 38, 40 which are functioned to open or vertically space apart sufficiently to allow the heated end of the pipe 12 to be applied therebetween. The upper and lower pressure clamps 38, 40 are then reciprocated respectively by the upper and lower cylinders 28, 32 to close and seal about the heated pipe end during the belling function.

The upper pressure clamp 38 comprises a steel body 64 which is shaped to define an interior semi-cylindrical cavity 66 of suitable size to receive therein a portion of the pipe 12 as it is shaped upon the mandrel 14. The forward extent of the cavity 66 is defined by the front wall 68 and the rearward extent of the cavity 66 is defined by the rear wall 70. Left and right, bottom, longitudinal edges 72, 74 complete the configuration of the upper pressure clamp 38. The front wall 68 is configured to form a bottom, semi-circular opening 76 of configuration to conform to the outer configuration of the pipe 12. The semi-circular opening 76 is provided with a groove 78 within which is positioned an O-ring gasket 84 for clamp sealing purposes, against the outer periphery of the pipe 12. The rear wall 70 of the upper pressure clamp 38 is similarly provided with a semi-circular opening 86 of configuration and size to receive therein the mandrel 14 when it is urged to its said belling position 60. The rear semi-circular opening 86 is provided with a semi-circular notch 88 to receive therein in sealing engagement, an upper, semi-circular portion of a sealing gasket 90 which is carried upon the mandrel 14.

The lower pressure clamp 40 comprises a steel body 92 which is shaped to define an interior, semi-cylindrical cavity 94 of suitable size to receive therein a portion of the pipe 12 as it is shaped upon the mandrel 14. The forward extent of the cavity 94 is defined by the front wall 96 and the rearward extent of the cavity 94 is defined by the rear wall 98. Left and right bottom, longitudinal edges 100, 102 complete the configuration of the lower pressure clamp 40. The front wall 96 is configured to form a lower, semi-circular opening 104 of configuration to conform to the outer configuration of the pipe 12. The semi-circular opening 104 and the left and right longitudinal edges 100, 102 are respectively provided with grooves 106, 108, 110 within which is positioned an O-ring gasket 112 for clamp sealing purposes. The rear wall 98 of the lower pressure clamp 40 is similarly provided with a semi-circular opening 116 of configuration and size to receive therein the mandrel 14 when it is urged to its said belling position 60. The semi-circular opening 116 is similarly equipped with a rearwardly positioned, semi-circular notch 120 to receive therein in sealing engagement the sealing gasket 90 which is carried upon the mandrel 14. A back up ring 122 with suitable fasteners 124 secures the gasket 90 to the mandrel 14. See FIGS. 2, 3A and 3B.

The lower pressure clamp 40 is provided with an air channel 126 which at its inner end communicates with the cavity 94 to permit the application of fluid pressure forces about the exterior periphery of the pipe 12 during the belling process. The channel 126 extends through the clamp body 92 and terminates exteriorly in a tapped opening 128. A suitable fitting 130 is threadedly engaged in the opening 128 to interconnect the flexible nose 132 in a conventional manner. Accordingly, the application of fluid pressure through the hose 132 pressurizes the interior pressure chamber 134 which is defined by the respective upper and lower cavities 66, 94 when the upper and lower pressure clamps 38, 40 are urged together. See FIG. 3A.

The upper pressure clamp 38 is additionally equipped with an upper water channel 136 which terminates outwardly in a threaded opening 138 to which is applied a conventional fitting 140 for connection of the cooling water hose 142. Similarly, the lower pressure clamp 40 is equipped with a lower water channel 144 which terminates outwardly in a tapped opening 146 to which is threadedly connected a fitting 148 for connection of the lower clamp water hose 150.

In operation of the pipe belling machine 10, the lengths of plastic pipe 12 are delivered sequentially to the belling machine by utilizing known pipe transporting apparatus, with the end to be belled sufficiently heated to render the plastic material soft and pliable. The mandrel 14 and the upper and lower pressure clamps 38, 40 are employed in cooperation for impressing the desired bell shape. By utilizing suitable, known apparatus (not illustrated), each length of plastic pipe 12 is delivered to the pipe belling machine 10 sequentially with the heated end positioned between the upper and lower pressure clamps 38, 40 in concentric alignment with the mandrel 14. Initially, the upper and lower pressure clamps 38, 40 are separated as illustrated in FIGS. 1 and 2 in an initial position to receive the pipe end therebetween. A switch (not shown), which may be contact type or photoelectric type of known design is positioned in known manner to be activated by the presence of the pipe 12 to activate a control circuit contained within the control cabinet 152. In response to the control circuit, the mandrel cylinder 34 activates its arm 54 to reciprocate the mandrel 14 into the end of the heated pipe 12. As previously stated, the end of the pipe 12 has previously been heated and accordingly is soft and pliable enough to conform to the configuration and contours of the mandrel 14. By employing suitable timers (not shown), switches (not shown), or other known control devices contained within the control cabinet 152, the upper and lower cylinders 28, 32 are simultaneously operated to oppositely reciprocate their respective piston rods 46, 50 to move the upper and lower pressure clamps 38, 40 from their spaced apart position as illustrated in FIG. 3A. With the upper and lower pressure clamps 38, 40 positioned as in FIG. 3A, it will be noted that the lower peripheral O-ring gasket 112 registers with and seals against the longitudinal edges 72, 74 of the upper clamp 38. The upper O-ring gasket 84 which is positioned about the upper clamp opening 76 seals directly against the outer periphery of the pipe 12. Similarly, the portion of the lower O-ring gasket 112 positioned within the opening 104 provided in the lower pressure clamp 40 similarly seals against the lower periphery of the pipe 12.

Rearwardly, when the mandrel 14 is fully forwardly extended as illustrated in FIG. 3A, the sealing gasket 90 is pressed into the semi-circular notches 88, 120 formed respectively in the semi-circular rear openings 86, 116 which are formed respectively in the rear walls 70, 98 of the upper and lower pressure clamps 38, 40. The pressure chamber 134 is thereby completely closed and sealed by action of the respective gaskets 84, 112 and the mandrel seal 90 to permit the application of pressure therewithin. If it is desired to form an internal groove in the pipe bell, the control circuit (not illustrated) then activates the segment expanding cylinder 154 whereby the piston arm 156 extends to turn the mandrel crank 158, thereby to rotate the mandrel shaft 160 for expanding the plurality of segments 16.

Fluid pressure, which may be air, is then applied to the pressure chamber 134 through the hose 132 which acts to pressuize the chamber through the fitting 130 and the channel 126. Fluid pressure through the hose 132 is maintained for a period of time sufficient to allow the plastic material in the pipe end to set up and to assume the shape of the mandrel 14 and the expanded plurality of segments 16 (if utilized). The timing of the pressure through the hose 132 is automatically controlled by the control circuit (not shown) contained within the control cabinet 152 in manner well known to those skilled in the art by utilizing suitable timers, switches and other mechanical or electrical apparatus. Preferably, the fluid employed is air and is maintained within the pressure chamber 134 between 80 psi to 100 psi. The amount of time of application of air pressure and the pressure itself can be varied as necessary depending on the thickness of the pipe sidewalls and the type of plastic employed. The pressure should be sufficient to accentuate the forming of the bell by uniformly pressing the soft, heated plastic pipe sidewalls against the mandrel exterior periphery. The air pressure produces the desired shape by pusing uniformly against the exterior periphery of the pipe sidewalls to force the plastic pipe sidewalls uniformly inwardly against the outer exterior configurations of the mandrel. In addition to applying uniform exterior pressure against the outer periphery of the plastic pipe, the air introduced through the hose 132 also tends to initiate cooling of the plastic pipe to initially set up the plastic material to permit withdrawal of the mandrel.

When initial cooling and set up of the plastic pipe sidewall has occurred, the air pressure is relieved and cooling water is sprayed about the exterior periphery of the shaped pipe sidewalls through the upper and lower water channels 136, 144. The water introduced through the respective upper and lower water hoses 142, 150 is also suitably controlled by the control circuit within the control cabinet 152 in manner well known to those skilled in the art to effect final cooling. After timing sufficiently for permanent set of the pipe bell to occur, the control circuit times out the water spray through the upper and lower openings 136, 144 and opens the drain channel 162 provided in the bottom pressure clamp 40 to permit the water (not shown) to run to drain through the drain hose 164. The water spray introduced through the upper and lower water channels 136, 144 may be introduced at usual city water pressure, for example between 40 psi and 60 psi to effect the desired cooling.

Upon draining of the cooling water, the mandrel cylinder 154 is again activated to withdraw its piston arm 156 to thereby to collapse the plurality of segments 16 from within the interior groove formed in the belled end by expanding the segments. The mandrel cylinder 34 is then activated to withdraw the mandrel 14 and the upper and lower cylinders 28, 32 are activated to oppositely reciprocate the upper and lower pressure clamps 38, 40 to open the sealed pressure chamber 134 to permit ejection of the belled pipe 12. With the upper and lower pressure clamps 38, 40 thus separated, the apparatus is ready to repeat the belling cycle upon introduction of the next length of plastic pipe.

Although the present invention has been described with a certain degree of particularity, it is understood that the present disclosure has been made only by way of example and that numerous changes in the details of construction and the combination and arrangement of parts may be made without departing from the spirit and scope of the invention as hereinafter claimed.

What is claimed is:

1. In a pipe belling machine of the type suitable to impress a bell shape in an end of successive lengths of plastic pipe wherein the end has been softened, the combination of
   a frame;
   a shaped mandrel mounted on the frame and adapted for reciprocal movement into and out of the softened end of the pipe for forming a bell shape; and
   pressure chamber means mounted on the frame and adapted for movement to encompass the softened end of the pipe and the shaped portion of the mandrel,
   the pressure chamber means comprising upper and lower sealing means to form a pressure retaining chamber about the softened end of the pipe; and
   means to introduce a fluid under pressure into the pressure retaining chamber;
   whereby the pressurized fluid presses against the softened end of the pipe and presses the softened end against the mandrel.

2. The pipe belling machine of claim 1 wherein the pressure chamber means comprises a plurality of separable pressure clamps, the pressure clamps being movable from an initial, spaced apart position to receive the softened pipe end to a pipe belling position to form the bell shape.

3. The pipe belling machine of claim 2 wherein the plurality of separable pressure clamps comprise an upper pressure clamp and a lower pressure clamp.

4. The pipe belling machine of claim 3 wherein the upper pressure clamp defines an upper cavity and the lower pressure clamp defines a lower cavity, the upper cavity and the lower cavity combining to form the pressure retaining chamber when the pressure clamps are urged to their said pipe belling position.

5. The pipe belling machine of claim 3 wherein the upper pressure clamp and the lower pressure clamp comprise left and right longitudinal edges and front and rear partly circular openings and wherein a first portion of the lower sealing means being positioned in the left and right longitudinal edges of the lower pressure clamp.

6. The pipe belling machine of claim 5 wherein the first portion of the lower sealing means abuts and seals against the respective left and right longitudinal edges of the upper pressure clamp when the upper and lower pressure clamps are urged to their said pipe belling position.

7. The pipe belling machine of claim 3 wherein the upper pressure clamp comprises an upper front semicircular opening and wherein a first semi-circular portion of the upper sealing means is positioned in the upper front semi-circular opening.

8. The pipe belling machine of claim 7 wherein the first semi-circular portion of the upper sealing means is adapted to contact and seal against the outer periphery of the pipe when the pressure clamps are urged to their said belling position.

9. The pipe belling machine of claims 3 and 7 wherein the lower pressure clamp comprises a lower front semicircular opening and wherein a first semi-circular portion of the lower sealing means is positioned in the lower front semi-circular opening.

10. The pipe belling machine of claim 9 wherein the first semi-circular portion of the lower sealing means is adapted to contact and seal against the outer periphery of the pipe when the pressure clamps are urged to their said belling position.

11. The pipe belling machine of claim 3 wherein the upper pressure clamp comprises an upper rear semi-circular opening and wherein the said rear opening is provided with an upper, rearwardly open, semi-circular notch.

12. The pipe belling machine of claim 11 wherein the said upper rear semi-circular opening is adapted to partially encircle and seal against the mandrel when the pressure clamps are urged to the said belling position and when the mandrel is moved into the softened end of the pipe.

13. The pipe belling machine of claim 3 wherein the lower pressure clamp comprises a lower rear semi-circular opening and wherein the said rear opening is provided with a lower rearwardly open, semi-circular notch.

14. The pipe belling machine of claim 11 or 13 wherein a peripheral seal is affixed to the mandrel and wherein the peripheral seal seats within and seals against a semi-circular notch when the upper and lower pressure clamps are urged to the said pipe belling position and the mandrel is moved into the end of the pipe.

15. The pipe belling machine of claim 13 wherein the said lower rear semi-circular opening is adapted to partially encircle and seal against the mandrel when the pressure clamps are urged to the said belling position and when the mandrel is moved into the softened end of the pipe.

16. The pipe belling machine of claim 1 wherein the means to introduce a fluid under pressure comprises a fluid pressure channel through the pressure chamber means in fluid communication with the pressure retaining chamber.

17. The pipe belling machine of claim 16 and cooling means provided in the pressure chamber means to cool the softened end of the pipe.

18. The pipe belling machine of claim 17 wherein the cooling means comprises a water channel through the pressure chamber means in fluid communication with the pressure retaining chamber.

* * * * *